United States Patent [19]
Bell et al.

[11] Patent Number: 5,919,091
[45] Date of Patent: Jul. 6, 1999

[54] COMBINED CASHLESS/CASH GAMING MACHINE

[75] Inventors: Lyle L. Bell, Las Vegas; Anthony J. Brolick, Boulder City; Daniel H. Scott, Las Vegas, all of Nev.

[73] Assignee: Caesars World, Inc., Las Vegas, Nev.

[21] Appl. No.: 08/954,807

[22] Filed: Oct. 21, 1997

Related U.S. Application Data

[63] Continuation of application No. 08/500,476, Jul. 10, 1995, abandoned.

[51] Int. Cl.⁶ ............................. G06F 15/28; A63F 9/24
[52] U.S. Cl. ........................ 463/25; 463/29; 463/42; 273/143 R; 235/380
[58] Field of Search ........................ 463/1, 20, 25, 463/29, 30, 31, 36–37, 40–42; 364/410, 412; 273/138.1, 138.2, 139; 345/173; 194/205, 210; 235/375, 380, 382, 382.5; 380/9, 16, 23, 24, 59

[56] References Cited

U.S. PATENT DOCUMENTS

| | | | |
|---|---|---|---|
| 4,283,709 | 8/1981 | Lucero et al. | 463/20 |
| 4,575,622 | 3/1986 | Pellegrini | 463/25 |
| 4,880,237 | 11/1989 | Kishishita | 463/25 |
| 4,889,339 | 12/1989 | Okada | 463/20 |
| 5,038,022 | 8/1991 | Lucero | 463/25 |
| 5,113,990 | 5/1992 | Gabrius et al. | 463/25 |
| 5,179,517 | 1/1993 | Sarbin et al. | 463/25 |
| 5,197,094 | 3/1993 | Tillery et al. | 463/25 |
| 5,265,874 | 11/1993 | Dickinson et al. | 463/25 |
| 5,269,521 | 12/1993 | Rossides | 463/25 |
| 5,332,076 | 7/1994 | Ziegert | 463/25 |
| 5,429,361 | 7/1995 | Raven et al. | 463/25 |
| 5,457,306 | 10/1995 | Lucero | 364/412 |
| 5,458,333 | 10/1995 | Takemoto et al. | 463/25 |
| 5,470,079 | 11/1995 | LeStrange et al. | 463/25 |
| 5,496,032 | 3/1996 | Okada | 463/25 |
| 5,505,461 | 4/1996 | Bell et al. | 463/25 |
| 5,577,959 | 11/1996 | Takemoto et al. | 463/25 |
| 5,613,911 | 3/1997 | Takemoto et al. | 463/25 |

OTHER PUBLICATIONS

"In Charge Cards", Electronics Now, Aug. 1993, p. 4.

*Primary Examiner*—Jessica J. Harrison
*Assistant Examiner*—Mark A Sager
*Attorney, Agent, or Firm*—Loeb & Loeb LLP

[57] ABSTRACT

The present invention relates to casino gaming machines such as slot machines and, more particularly, to a gaming machine having cash or cashless playing capability. More particularly, the invention relates to a gaming machine having a code generating apparatus for generating a unique authorization code; a credit card having a means for recording the code; a gaming machine having a system of play authorizing input; cash acceptance apparatus for accepting a unit of cash and for authorizing a play of the gaming machine. It also relates to a system including a plurality of gaming machines connected to a central computer and to security measures for use in such machines.

21 Claims, 7 Drawing Sheets

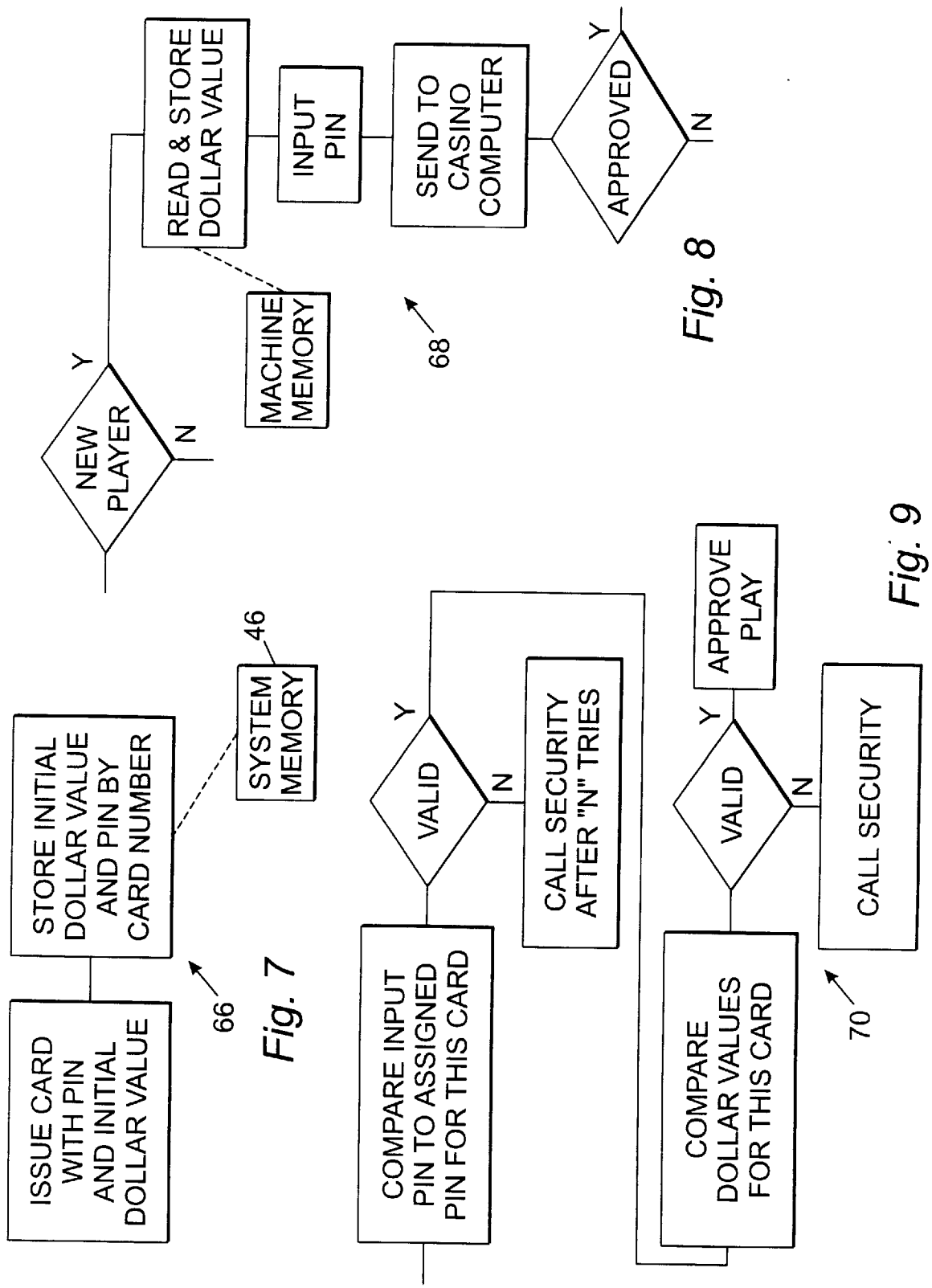

COMBINED CASHLESS/CASH GAMING MACHINE

This application is a continuation of application Ser. No. 08/500,476, filed on Jul. 10, 1995, now abandoned.

BACKGROUND

1. Field of the Invention

The present invention relates to casino gaming machines such as slot machines and, more particularly, to a gaming machine having cash or cashless playing capability.

2. Description of the Related Art

With the advent of the computer age and modern electronics, casino gaming machines have undergone a vast change in recent years. For many years, such machines were mechanical devices like the slot machine 10 of FIG. 1. Coins were inserted into the slot 12 and the handle 14 pulled by the player. Within the main window 16, three wheels 118 were spun behind individual windows 20 by the pulling of the handle 14. The wheels 18 had various indicia 22 on them at spaced peripheral positions. Depending upon the type of indicia and matching thereof appearing in the individual windows 20 when the wheels 18 stopped spinning, the player would win or lose that play of the machine. Upon winning, coins representing the amount won were dropped into the coin dish 24 from a coin hopper (not shown) within the slot machine 10.

The first step into the electronic and computer age was as depicted in FIG. 2 with the slot machine 10'. The main window 16 was replaced by a cathode ray tube (CRT) display screen 26. The wheels 18 were replaced by internal computer logic (not shown) and an animated display 28 of the calculated results of a "spin" displayed on the CRT display screen 26. The operation of each play was initiated by the insertion of one or more coins into the slot 12 as with the mechanical machine 10 of FIG. 1. Slot machines of the type shown in FIGS. 1 and 2 are still in use today.

Coins are cumbersome and the mechanical devices which accept them are prone to wear and failure. Thus, the use of cards or other devices for a so-called "cashless" gaming machine has been an object of desire for many people within the gaming industry. The typical prior art approach is depicted in FIG. 3. The coin slot 12 is replaced by a reader 28 which can read a identification card 30 or some similar approach. According to one prior art scheme, an identification card 30 is read in and the payout is by means of a printed voucher which can be redeemed at the casino's pay booths. In another prior art approach, the identification card 30 is actually a so-called "smart card" containing a computer memory chip which can be credited and debited electronically.

There has also existed a need to allow players to access outside financial institutions from the casino by having an automated teller machine (ATM) type of interface at the gaming machine. In the typical ATM interface as depicted in FIG. 4, there is a reader 28 which reads the magnetic stripe of an identification card 30 (or debit card). There is also a CRT display screen 26' and a numerical keypad 34 into which the user can input his/her personal identification number (PIN) so as to authorize use of the identification card 30 for the particular transaction. The ATM interface 32 communicates with the remote financial institution over the telephone wires 36 connected thereto.

As those skilled in the gaming art understand, any gaming machine must appeal to the user or the cashbox will diminish. In other words, a player will play those games that are appealing and will avoid those which are not. Some people like the feel and the sound of coins dropping into the coin dish 24. If that appeal is not available for them, they will not play the machine.

The gaming commissions of the various states where gambling is legal are also very wary of any payment or credit scheme that can be subject to potential abuse. Coins or tokens are hard to abuse. Credit cards and debit cards, on the other hand, provide the potential for great abuse. Possession of a person's credit/debit card and the PIN therefor can be used to transfer substantial amounts of money in a very short time. If the money was used to gamble and lost, even if the electronic thief is caught, there is no way to recover the money.

Esthetics and appearance are a large part of the gaming industry. The casino and its total ambiance are made such as to encourage the players to want to spend time there and play the games. Also, floor space in the casino is at a premium. Space not available for gaming machines represents lost revenue. The use of large ATM type interface devices such as that of FIG. 4 could result in space for fewer machines in a given floor area. Not only that, they could adversely effect the ambiance. The having of coins or other media of play is a positive for a player. The need to obtain credit in a manner for all to see is a negative. Winners do not need credit. Not only that, since a player's personal PIN number associated with a credit card or debit card is the only obstacle to unauthorized use of the card, it is highly desirable to provide a way in which the card can be used unobtrusively and with a minimized chance of the PIN number being observed during its input.

Therefore, it is an object of this invention to provide an electronic gaming system in which both cash and credit can be employed, which will overcome the above limitations and disadvantages.

It is another object of this invention to provide an electronic gaming system in which there is a high degree of security and privacy attached to credit transactions.

It is a further object of this invention to provide an electronic gaming system in which the possibility for illegal electronic value manipulation is minimized.

Other objects and benefits of the invention will become apparent from the detailed description which follows hereinafter when taken in conjunction with the following drawings and specification.

SUMMARY OF THE INVENTION

More particularly, the invention relates to a gaming machine system having a central computer for generating a unique identification code; for storing player credit; for storing a personal identification number (PIN); a player identification card having a means for recording the identification code; a gaming machine having a system for reading the identification code on the identification card, and input means for the player to enter the PIN and for transferring credit stored in the central computer to the gaming machine for play. A plurality of gaming machines are connected to a central computer and to security measures for use in such machines.

In the preferred embodiment, the central computer also stores the electronic funds transfer history of each of the separate gaming machines and contains logic means for disabling a particular gaming machine if the funds transfer history stored in the particular gaming machine is different from the electronic funds transfer history for that particular gaming machine stored in the central computer.

Preferably, each gaming machine also includes a display for displaying alphanumeric messages to a player and a keypad for a player to input the PIN, the amount of credit requested and to respond to other messages.

The preferred embodiment also includes security means for making the input of the PIN on the keypad difficult to visually steal by an observer. This may comprise positionally changing number positions in the keypad each time it is displayed.

For cash play, each of the plurality of gaming machines may include cash acceptance apparatus for accepting a unit of cash and for authorizing immediate play of the gaming machine.

BRIEF DESCRIPTION OF THE DRAWINGS

FIG. 7 is a logic diagram of logic which can be used in the casino computer of the present invention.

FIG. 8 is a logic diagram of logic which can be used in the slot machine computer of the present invention.

FIG. 9 is a logic diagram of logic which can be used in the casino computer of the present invention.

DESCRIPTION OF THE PREFERRED EMBODIMENT

Figure 5:
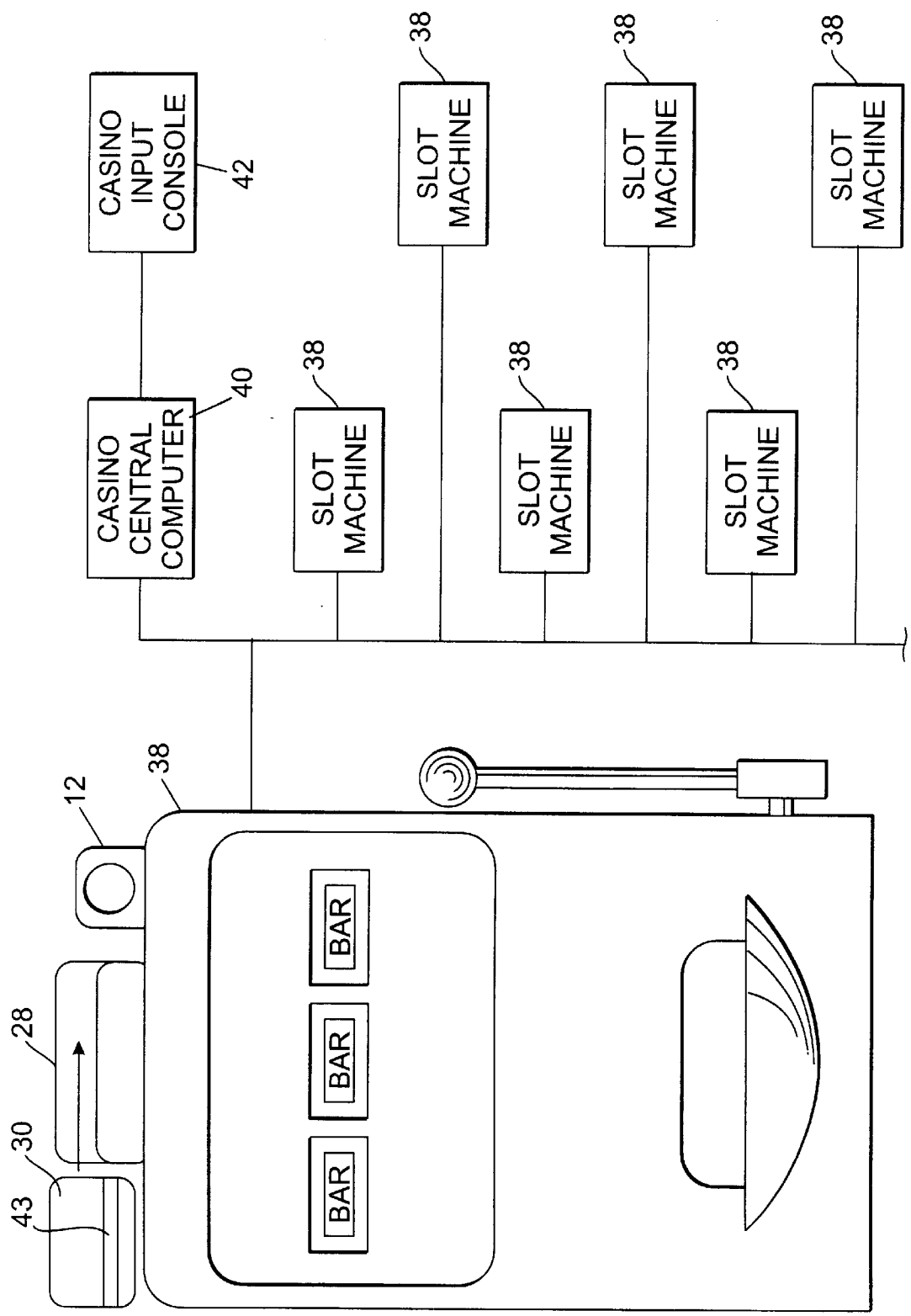
FIG. 5 is a simplified drawing and combined functional block diagram of a combined coin/coinless electronic gaming system according to the present invention.

A combined cash/cashless gaming system according to the present invention is depicted in FIG. 5. A plurality of electronic slot machines 38 are connected to a central computer 40 at a secure location, note accessible to the public. The central computer 40 has at least one input console 42 connected thereto. Each slot machine 38 has a coin slot 12 and a reader 28 for reading the magnetic stripe 43 of an identification card 30 issued by the casino to the player. Any number of different readers may be employed, such as those that read the magnetic stripe when the card is moved relative the reader, or those where the card is read while stationary.

Prior to playing the slot machine, a new player would go to a location in the casino where he/she is issued the identification card 30. The input console 42 is used, in association with standard commercially available magnetic strip encoding devices, to place the unique identification code on the magnetic stripe 43. The player then enters a PIN, preferably at another location within the casino for internal casino security reasons, which is stored in the computer associated with said identification code. An initial amount of monetary value is stored in the central computer 40, associated with the unique identification card. The monetary value stored can represent cash or check given to the casino operator, credit secured by a credit card or debit card from an outside institution, or credit issued by the casino based on it own criteria, or any other source of credit.

Figure 6:
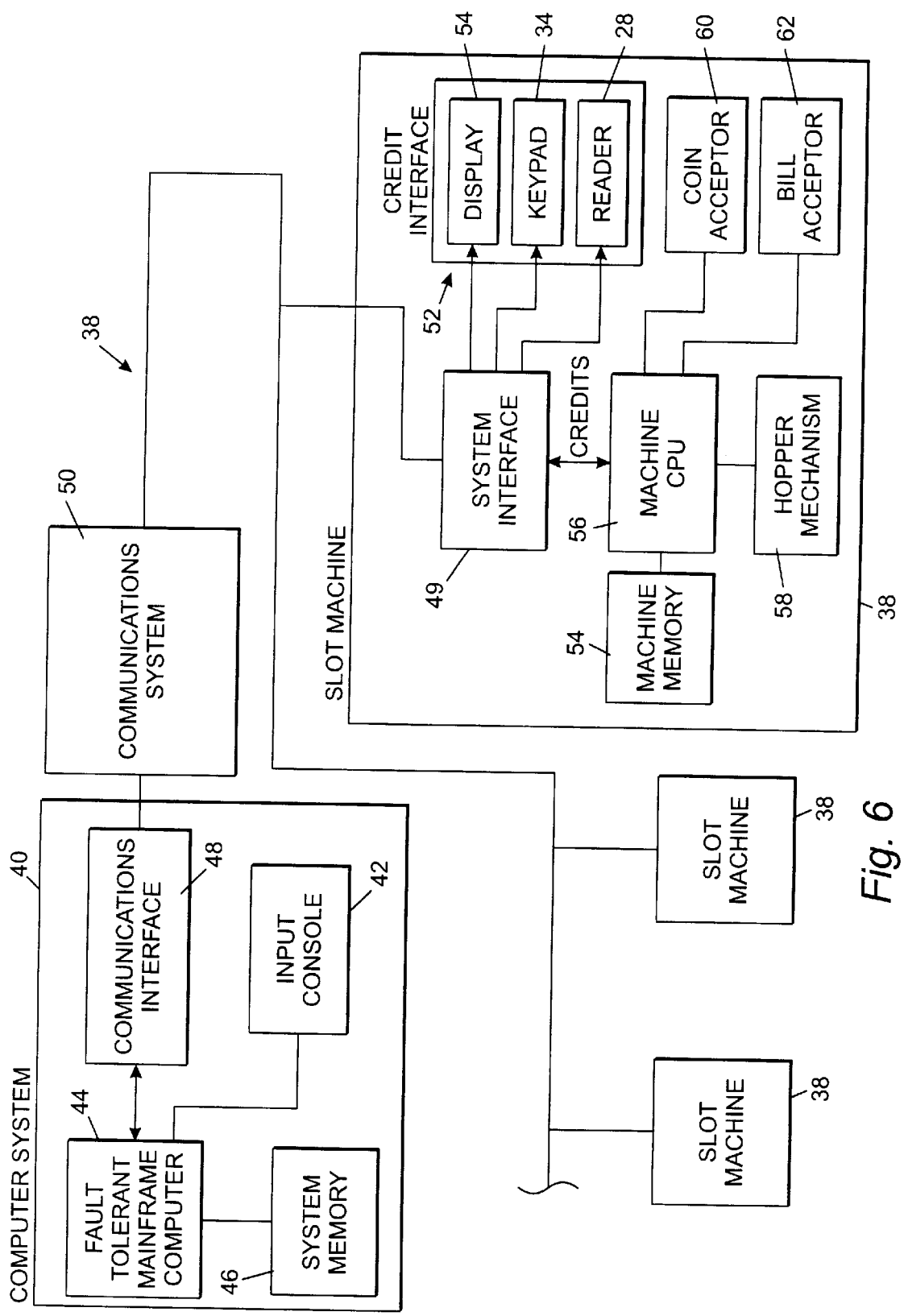
FIG. 6 is a more detailed functional block diagram of the combined coin/coinless electronic gaming system of the present invention.

The system is depicted from a computer control point of view in FIG. 6. The central computer 40 comprises a computer system including a fault tolerant mainframe computer 44 connected to a system memory 46, a communications interface 48, and the input console 42. Fault tolerant means that the computer 44 is not prone to stopping or "crashing" and maintains all data in a manner such that it will not be lost or compromised should an unforeseen event (such as an extended power loss or the like) cause the computer 44 to stop and have to be restarted. Preferably, the computer 44 is connected to an UPS (uninteruptable power supply) system and all memories described herein are self maintaining.

The central computer 40 is connected to the slot machines 38 through a secure communications system 50. Techniques for communicating in a, secure manner are known to those in the communications and computer arts. Therefore, this aspect will not be addressed in any detail herein.

Each slot machine 38 has a system interface 49 interfacing it to the communications system 50. It also has a credit interface 52 comprising a display 54, a keypad 34, and a card reader 28 which is accessed through the system interface 49. There is a machine CPU (i.e. computer) 56 that performs the logic implemented in the slot machine to accomplish the game being played as well as the functions of the present invention as described hereinafter. The machine CPU 56 is connected to the system interface 49 and credits (and other necessary information) are transmitted over the connection. The machine CPU 56 controls the hopper mechanism 58 whereby the slot machine 38 can dispense cash to a player. There is also a coin acceptor 60 connected to the CPU 56. Optionally, a bill acceptor 62 can also be provided.

The manner in which the system operates and its unique features can best be understood by reference to representative logic which can be implemented in the computer mainframe 44 and each of the machine CPU 56. Representative logic will now be described referring first to FIG. 7. The logic 66 issues a identification card 30 having its own unique identification number imprinted into the magnetic stripe 43. The PIN selected by the player as described above is also stored.

At the same time, the logic 66 stores the initial dollar value of available credit and the PIN is stored into the system memory 46 indexed by the unique identification number of the identification card 30. The identification card 30 and player can then be tracked and checked during the play period which follows.

Instead of a card having a magnetic stripe, other media, such as a smart card, could also be employed. The smart card could have any means for identifying the player such as thumb print, etc.

Turning now to FIG. 8, there is logic 68 implemented in the CPU 56 of each slot machine 38. The logic 68 constantly checks to see if a new player is playing the machine. If not, it continues its present play mode. When a new player appears, access is made either by inserting a coin (or bill) into the slot machine or by passing the identification card 30 through the reader 28. When in the coin/bill mode, the slot machine 38 can be played by any player having a coin or bill with which to play. When the player has the slot machine 38 read his/her identification card 30, a new mode of operation of the slot machine 38 is begun. Once the identification card 30 is inserted and the first transfer of funds is made, no further payout from the hopper of the slot machine 38 is permitted. Under the Federal Credit Act, if money or coins were permitted to be obtained from the slot machine, there would be a possibility that the casino would be responsible for claims that someone other than the authorized identification card holder obtained the money or coins from the slot machine.

The logic 68 reads the identification code of the identification card. While it is possible to remove the identification card, it is preferable to have the identification card remain in the gaming machine while the PIN is entered to avoid fraud. The player is then asked to input his/her PIN through the keypad 34. If the PIN entered on the key pad 34 matches the PIN associated with ID stored in the computer, operations continue. The player enters on the key pad 34 a dollar amount to be transferred for play of the slot machine. The amount can be varied or be a predetermined set amount, i.e. discrete levels.

The logic 70 of FIG. 9 is implemented in the mainframe computer 44 and is the logic which interfaces with the machine logic 68 of FIG. 8. The logic 70 first compares the PIN inputted by the player to the PIN associated with the identification card 30 as contained in the system memory 46. If there is a match, the logic 70 continues. If there is no match, it may be a simple input mistake by the user. Initially, a "PLEASE TRY AGAIN" message can be output to the display 54. After a pre-established number of tries, there must be a problem. On the possibility that a stolen card is involved, either security would be dispatched to the slot machine 38 to investigate, or the card would be disabled. If it is a technical problem, security can provide the player with helpful assistance. When the PIN matches the PIN stored in association with the identification number, the dollar value for the card is then compared to that amount selected by the player on the keypad stored in the system memory 46. If there is available credit for that amount, the requested credit is transferred to the credit meter of the slot machine. In the preferred embodiment, the identification card must be removed to complete the transaction and the slot machine would then be played in its normal mode of operation. This makes its more likely that the player will not leave the identification card in the gaming machine. However, it is possible to have the logic complete the transaction without removing the identification card.

At the end of play, the player reinserts the identification card and again enters the PIN in response to the message on the output display 54. The credit on the meter is transferred to the central computer 40 to the account of the player associated with the identification card. The identification card is then removed. The player can then use the stored credit to play other games, or recover the cash value of the credits from the casino.

Figure 10:
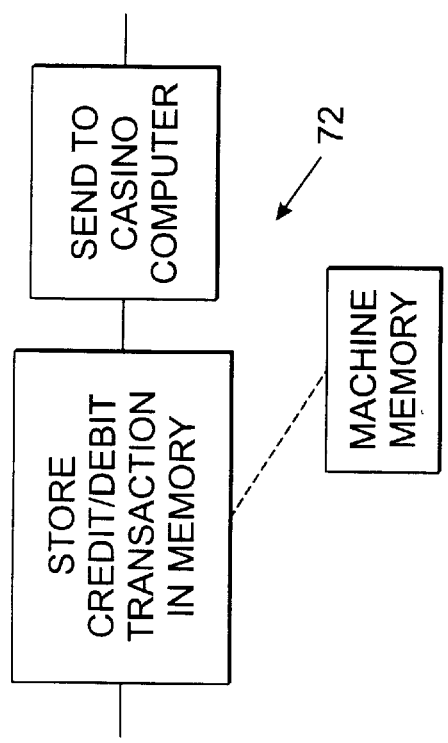
FIG. 10 is a logic diagram of logic which can be used in the slot machine computer of the present invention.

The system of the present invention provides a high degree of security and system integrity through a checks and balance system. Part of that system of checks and balances has already been described. FIG. 10 shows another aspect of it. Every time a funds transfer is made, in either direction, the logic 72 stores the information in the central computer 40.

Figure 11:
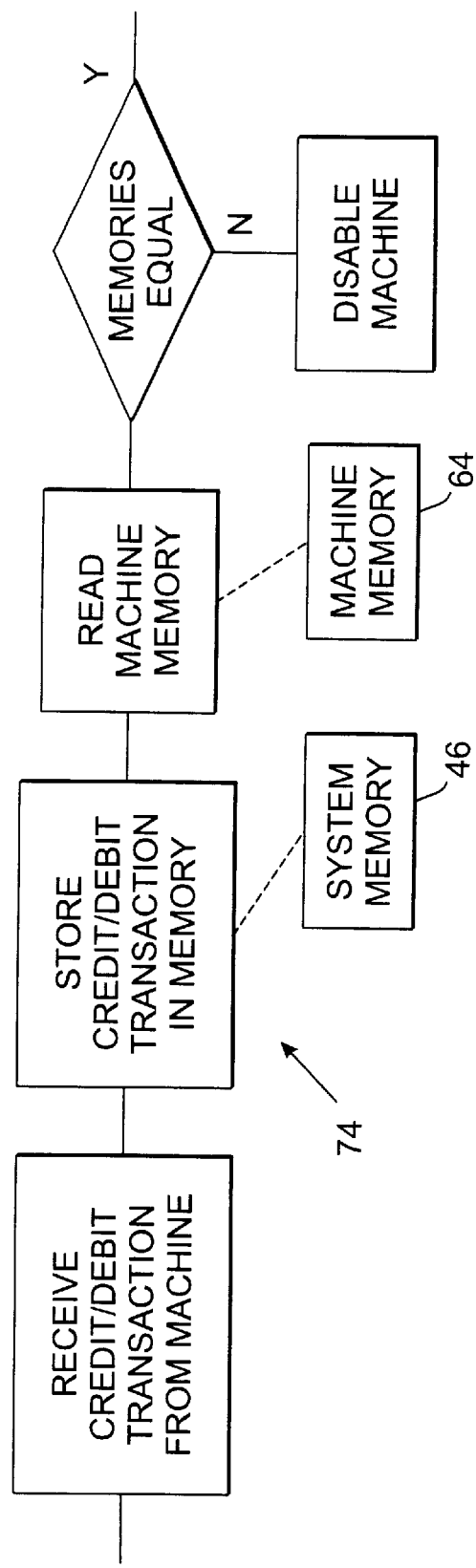
FIG. 11 is a logic diagram of logic which can be used in the casino computer of the present invention.

The corresponding logic 74 in the mainframe 44 is shown in FIG. 11. The logic 74 receives the credit transaction from the slot machine 38. It then uses the information to independently update its own records for that slot machine 38 within the system memory 46. In addition to maintaining data associated with each identification card 30 from the moment of issue until it is accounted for as no longer in possible play, the system memory 46 also keeps a duplicate set of data on each slot machine 38. If there are no problems, the data for each slot machine 38 in the system memory 46 should exactly match that in the machine's own machine memory 64. Thus, the logic 74 reads the machine memory 64 for the slot machine 38 which just reported the transaction and compares it to the data for that slot machine 38. If there is a match, the logic 74 does nothing. If there is not a match, the slot machine 38 is disabled and maintenance is notified to check the machine.

Figure 13:
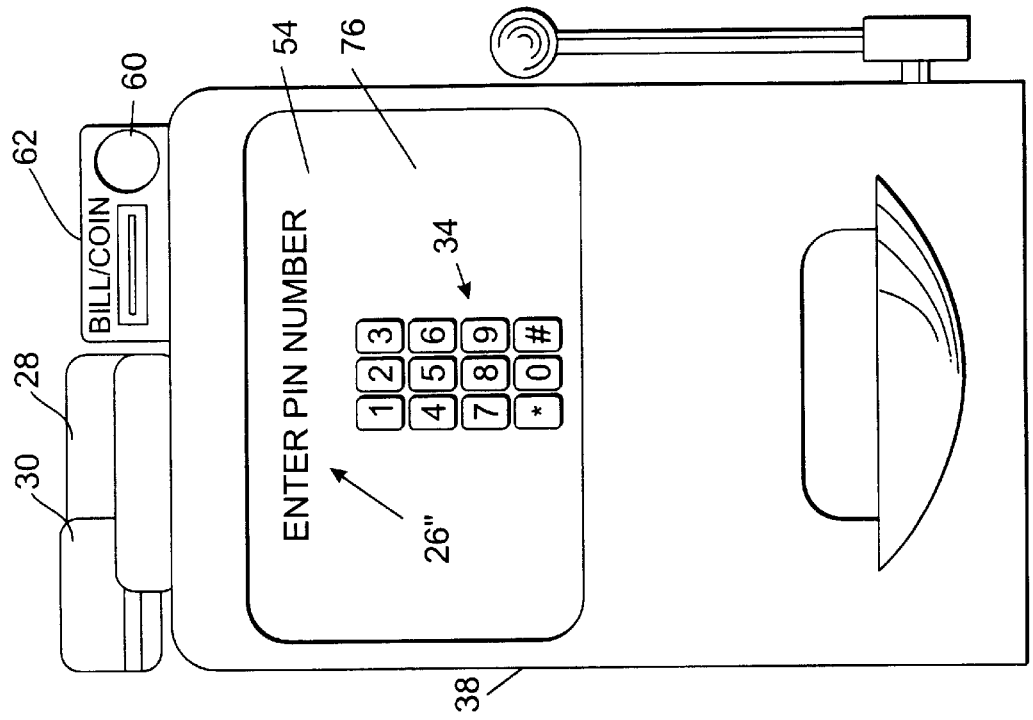
FIG. 13 is a drawing of a slot machine according to the present invention in a preferred embodiment in which the CRT display screen is a touch screen which functions as both the gaming screen and an ATM type interfacing screen shown in the ATM screen mode.
Figure 12:
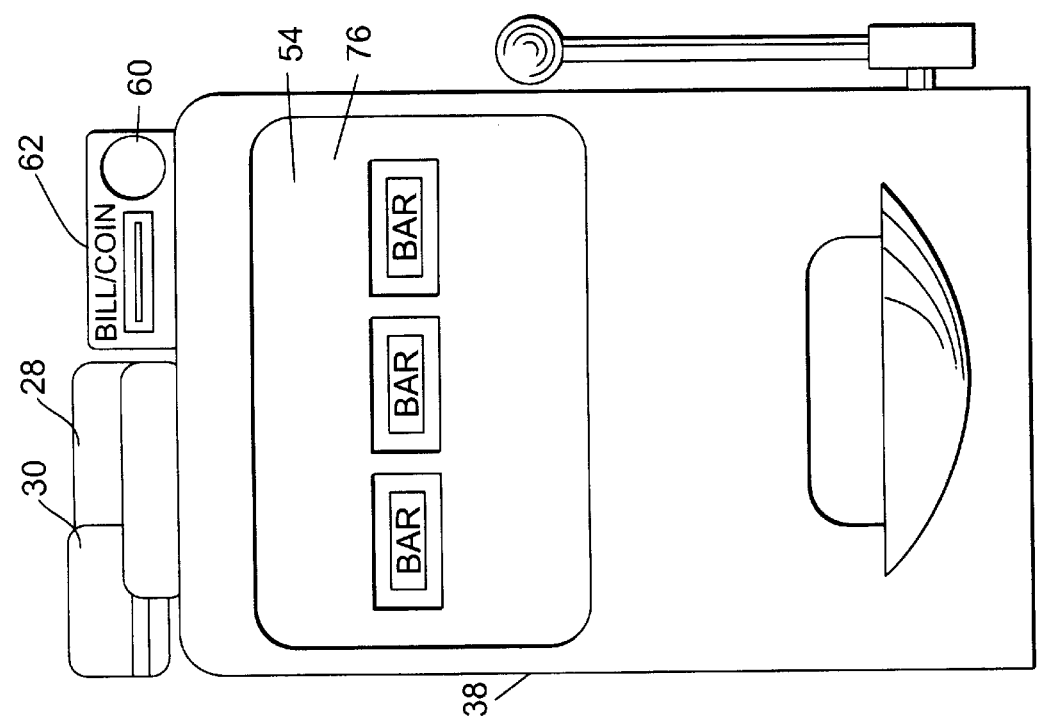
FIG. 12 is a drawing of a slot machine according to the present invention in a preferred embodiment in which the CRT display screen is a touch screen which functions as both the gaming screen and an ATM type interfacing screen shown in the gaming screen mode.

A final aspect of the present invention in a preferred embodiment is shown in FIGS. 12 and 13. The display 54 is covered with a touch screen 76. The touch screen 76 can be of any type as well known to those of ordinary skill in the art which senses positional touching of the display 54 by a player's finger or the like. With this added capability, the display 54 functions in two modes.

As depicted in FIG. 12, the display 54 spends most of its time in a game mode in which the game or an advertising mode display appears. As depicted in FIG. 13, however, when the player is in the credit mode as entered by inserting an identification card 30 into the reader 28, the display 54 acts as the display 26' and the keypad 34 of an ATM type terminal. Thus, the display 54 in combination with the touch screen 76 operates in a dual mode. As those of ordinary skill in the art will undoubtedly recognize, the presence of the touch screen in a gaming machine increases the capability and possibility of games to be played thereon. Selections of items displayed on the display 54 can be made by touching the screen 76 rather than requiring separate buttons to be provided for the purpose. In an electronic gaming machine, this also allows the game to be changed easily by simply changing a read only memory (ROM) chip in the CPU 56 without concern for buttons and external markings and indicia.

Figure 2:
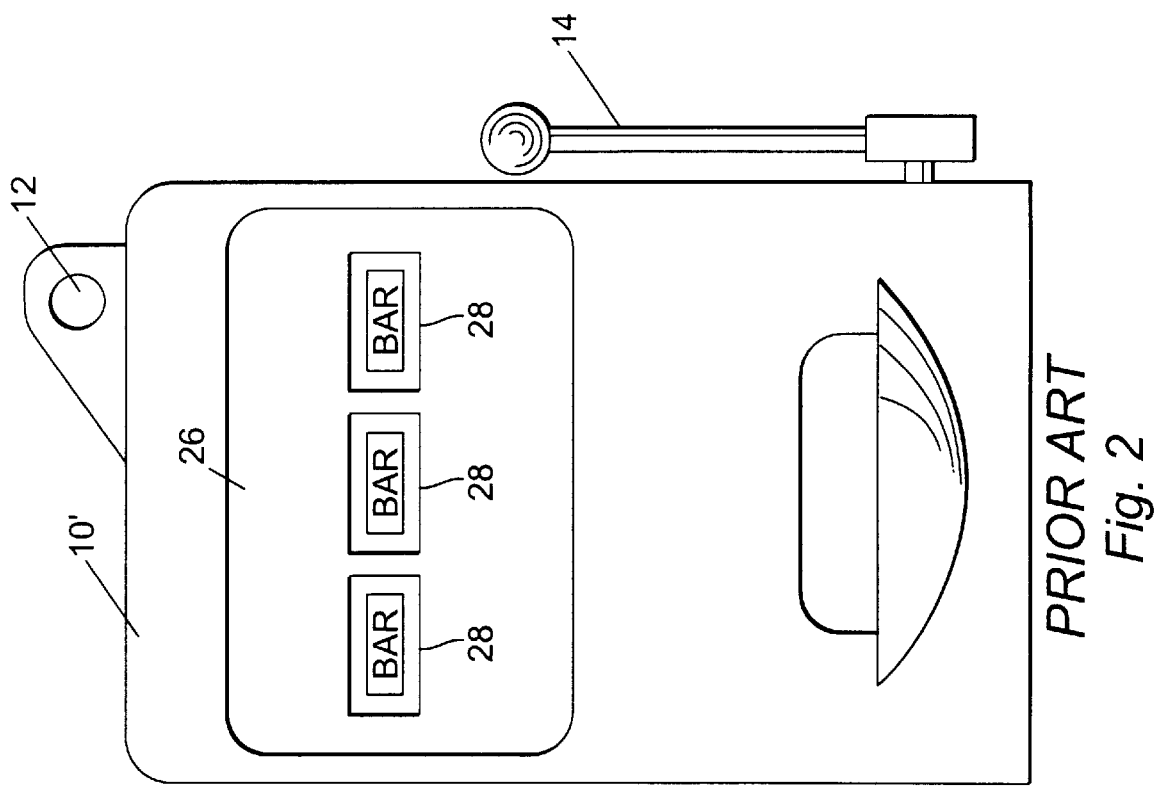
FIG. 2 is a simplified drawing of a prior art coin-operated, electronic slot machine with a CRT display.
Figure 1:
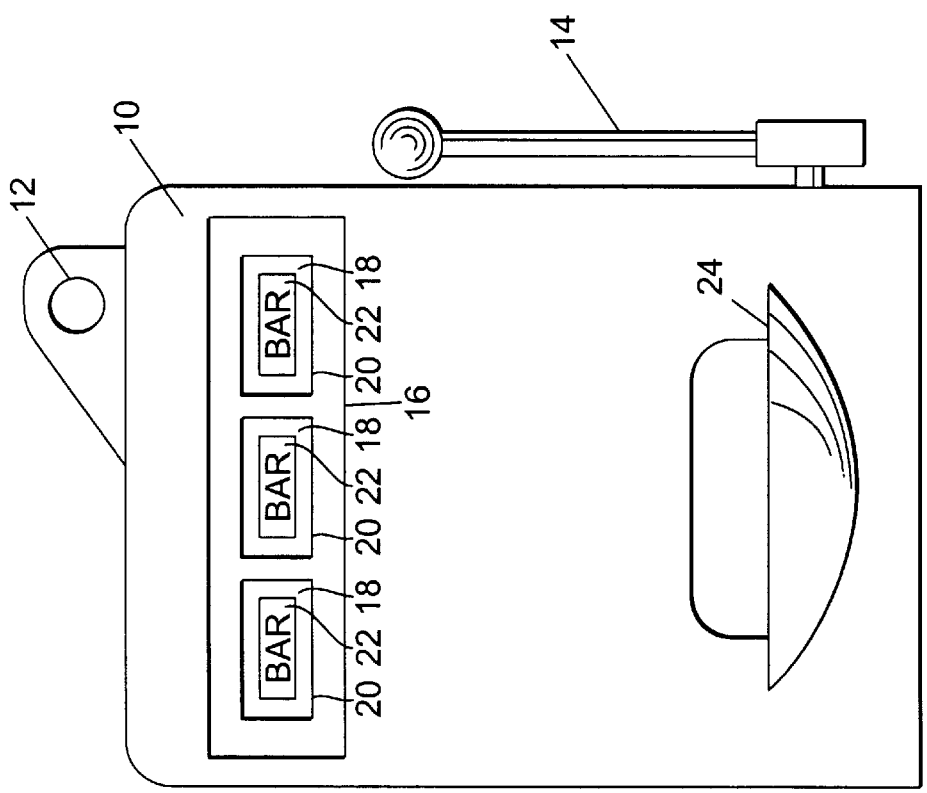
FIG. 1 is a simplified drawing of a prior art coin-operated, mechanical slot machine.
Figure 4:
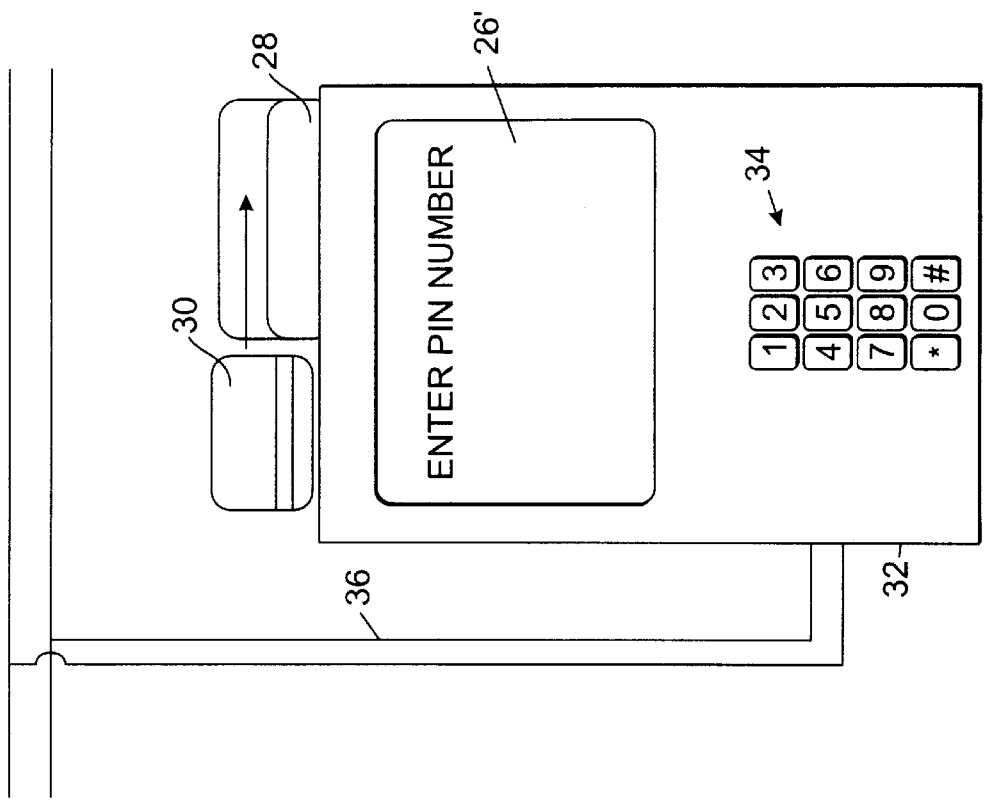
FIG. 4 is a simplified drawing of a typical prior art automated teller machine (ATM) type credit interface.
Figure 3:
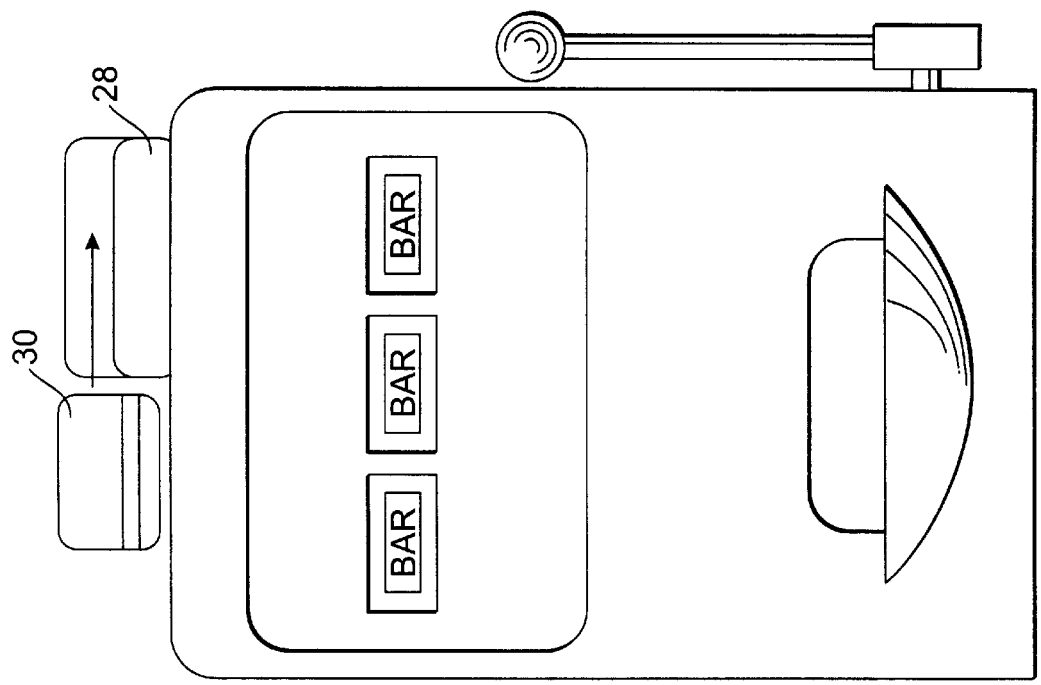
FIG. 3 is a simplified drawing of a prior art credit card-operated, electronic slot machine with a CRT display.

The primary reason for the touch screen 76, however, is for ATM type terminal purposes reducing space requirements and offering greater security and privacy for the player. As seen in FIGS. 12 and 13 as compared with the drawings of FIGS. 4 and 6, the entirety of the equipment required to play in a cash/cashless mode as possible with the present invention can be accomplished in a space footprint no bigger than the prior art machines of FIGS. 1 and 2. The card reader 28 and the bill/coin acceptors 62,60 are located on top of the slot machine 38 and the remaining display and keypad functions are accomplished on the display 54 and touch screen 76. While the credit display ENTER PIN NUMBER and the displayed keypad 34 are shown in conventional manner in FIG. 13, this is for convenience of understanding only. In actual practice, various techniques can be used to mask the credit function and to make unauthorized acquisition of the player's PIN more difficult. For example, the display 54 in a credit mode of operation can employ a colored and animated display which appears to the casual user as a game display rather than announcing to those in the area fact that the player is about to enter a PIN number.

The keypad 34 can also be displayed in a less regular fashion. Anyone familiar with the typical "telephone" keypad configuration of FIG. 13 can tell what numbers are being selected by simply watching the position of the user's fingers. If a row and column arrangement is used for the keypad 34, the numbers of the "buttons" can be positionally changed each time the keypad 34 is displayed. Preferably the locations of the numbers and symbols on the screen would be changed relative to each other each time a card was inserted in the ATM. This is done under microprocessor control so that a random display pattern is generated for each new customer. For example, in lieu of the regular locations that are used in the touch tone pad of the telephone, as shown in FIG. 13, the pattern would be changed for the next customer. Thus after a customer leaves and the next customer inserts a card, the request to enter a PIN would display a randomly generated location pattern such as:

| 3 | 7 | 1 |
| # | 9 | 4 |
| 0 | 8 | * |
| 6 | 2 | 5. |

While this might slow the transaction process for the customer who has memorized one set of ATM locations so as to input the PIN by reflex, it does provide enhanced security. The buttons of the keypad 34 could also be displayed along the top edge of the display 54 and a small hood attached over the top of the display 54. That way, the buttons could only be seen by a player from his/her position seated in front of the display. The player would have to reach up under the hood to enter the PIN. By also positionally changing the numbers of the buttons as described above, casual observers would be virtually unable to obtain unauthorized knowledge of the player's PIN.

While in the preferred embodiment the use of a magnetic read only card was described, it is recognized that other means of recording and inputting data may be used, such as memory chips, without departing from the scope of the invention. Also, media other than a card could be used.

Also, the casino may transfer additional credits to the players account or slot machine at any time. This would typically be in association with play credit cards that are accumulated by the player when using a slot machine to encourage play. Such additional credits can be issued at any time. The play credit card is inserted into the card reader after the identification card 30 is removed after credit is obtained.

Also, while it is possible to have the receipts from ATM credits obtained at the gaming machine, it is also possible to have a summary of all ATM activity stored on a single record of the transactions issued to the player from a central location.

What is claimed is:

1. A gaming machine system for use with a plurality of media for storing a unique identification code associated with each of said media, said gaming machine system comprising:

a plurality of gaming machines each having means for reading said unique identification code from said plurality of media and each of said gaming machines having means for storing credit and transactions in association with said unique identification code, said storing means storing a record of transactions occurring at a respective one of said gaming machines;

a central computer in communication with said plurality of gaming machines for storing a unique identification code and credit and transactions associated with said identification code, said central computer storing a record of transactions for each of said gaming machines;

an authorizing code associated with said identification code and means, associated with said gaming machine, for inputting said authorizing code; and means for authorizing and transferring funds for play of said gaming machines to said gaming machines in response to entry of a proper authorizing code, said authorizing and transferring means comparing credit and records of transactions stored in said gaming machines with credit and records of transactions stored in said central computer to control play of said gaming machines.

2. The gaming machine system of claim 1 wherein said records of transactions stored in said central computer includes a record of said transfer of funds between each of said gaming machines and said central computer.

3. The gaming machine system of claim 1 wherein said central computer stores an amount representative of said transferred funds.

4. The gaming machine system of claim 1 wherein said gaming machine requires input of said authorizing code before play of said gaming machine.

5. The gaming machine system of claim 4 wherein each of said plurality of gaming machines includes a keypad for a player to input said authorizing code.

6. The gaming machine system of claim 5 further comprising security means for making said authorizing code input to said keypad difficult to visually see by an observer.

7. The gaming machine system of claim 6 wherein said security means comprises means for positionally changing number positions in said keypad each time said keypad is displayed.

8. The gaming machine system of claim 1 further comprising means for preventing transfer of said funds without removal of said media from said gaming machine.

9. A gaming machine system comprising:

a plurality of gaming machines each having a memory for storing credit and a record of transactions in association with unique identification codes, a play authorizing input, cash equivalence acceptance apparatus for accepting a unit of cash equivalence and for authorizing a play of said gaming machine at said play authorizing input in response thereto;

a plurality of media for storing a unique identification code;

a central computer connected to said plurality of gaming machines, said central computer having a system memory for storing credit and records of transactions in association with said unique identification code, said central computer storing a record of transactions for each of said gaming machines;

write means for writing unique identification codes onto each of said plurality of media;

read means connected to each of said gaming machines for reading said unique identification code from respective ones of said plurality of media;

input means for inputting into said central computer credits associated with said unique identification code;

said central computer transferring said credits to the memory of said gaming machines in response to entry of a personal identification number associated with said unique identification code, said central computer comparing credit and records of transactions stored in said gaming machines with credit and records of transactions stored in said central computer to control play of said gaming machines.

10. The gaming machine system of claim 9 wherein said records of transactions stored in said central computer includes a record of electronic transfers of funds between the central computer and the gaming machine.

11. The gaming machine system of claim 9 wherein each of said plurality of gaming machines includes cash acceptance apparatus for accepting a unit of cash and for authorizing a play of one or more of said plurality of gaming machines at said play authorizing input in response thereto; and said cash acceptance apparatus immediately authorizes a play of an associated one of said plurality of gaming machines at said play authorizing input in response to a unit of cash being input thereto.

12. The gaming machine system of claim 10 wherein each of said plurality of gaming machines further comprises:

a display for displaying alphanumeric messages to a player; and, a keypad for a player to input said personal identification number.

13. The gaming machine system of claim 11 further comprising:

an alphanumeric display included as part of each of said plurality of gaming machines for game play; and, a touch screen disposed over each said alphanumeric display for positional selection inputs on said alphanumeric display by a player; and wherein, said alphanumeric display is used as said display for displaying alphanumeric messages to a player; and, said alphanumeric display and said touch screen in combination are used as said keypad.

14. The gaming machine system of claim 12 further comprising:

security means for making said authorizing code input to said keypad difficult to see by an observer.

15. The gaming machine system of claim 14 wherein said security means comprises means for positionally changing number positions in said keypad each time it is displayed.

16. The gaming machine system of claim 15 wherein said means for positionally changing the number positions is a computer controlled random position generator.

17. A gaming machine system for use with a plurality of media for storing a unique identification code associated with each of said media, said gaming machine system comprising:

a plurality of gaming machines each having means for reading said unique identification code from said plurality of media and having means for storing credit in association with said unique identification code;

a central computer in communication with said plurality of gaming machines for storing a unique identification code and credit associated with said identification code;

an authorizing code associated with said identification code and a keypad, for a player to input said authorizing code, associated with each said gaming machine for inputting said authorizing code;

means for authorizing and transferring funds for play of said gaming machines to said gaming machines in response to entry of a proper authorizing code, said authorizing and transferring means comparing credit stored in said gaming machines with credit stored in said central computer to control play of said gaming machines; and security means for making said authorizing code input to said keypad difficult to visually see by an observer.

18. The gaming machine system of claim 17 wherein said security means comprises means for positionally changing number positions in said keypad each time said keypad is displayed.

19. A gaming machine system comprising:

a plurality of gaming machines each having a memory for storing credit in association with unique identification codes, a play authorizing input, cash equivalence acceptance apparatus for accepting a unit of cash equivalence and for authorizing a play of said gaming machine at said play authorizing input in response thereto, a display for displaying alphanumeric messages to a player, and a keypad for a player to input said personal identification number;

security means for making said authorizing code input to said keypad difficult to see by an observer a plurality of media for storing a unique identification code;

a central computer connected to said plurality of gaming machines, said central computer having a system memory for storing credit in association with said unique identification code;

write means for writing unique identification codes onto each of said plurality of media;

read means connected to each of said gaming machines for reading said unique identification code from respective ones of said plurality of media;

input means for inputting into said central computer credits associated with said unique identification code; and said central computer transferring said credits to the memory of said gaming machines in response to entry of said personal identification number associated with said unique identification code, said central computer comparing credit stored in said gaming machines with credit stored in said central computer to control play of said gaming machines.

20. A gaming machine system comprising:

a plurality of gaming machines each having a memory for storing credit in association with unique identification codes, a play authorizing input, cash equivalence acceptance apparatus for accepting a unit of cash equivalence and for authorizing a play of said gaming machine at said play authorizing input in response thereto, each of said gaming machines including a display for displaying alphanumeric messages to a player and a keypad for a player to input said personal identification number;

security means for making said authorizing code input to said keypad difficult to see by an observer, said security means comprises means for positionally changing number positions in said keypad each time said key pad is displayed;

a plurality of media for storing a unique identification code;

a central computer connected to said plurality of gaming machines, said central computer having a system memory for storing credit in association with said unique identification code;

write means for writing unique identification codes onto each of said plurality of media;

read means connected to each of said gaming machines for reading said unique identification code from respective ones of said plurality of media;

input means for inputting into said central computer credits associated with said unique identification code; and said central computer transferring said credits to the memory of said gaming machines in response to entry of a personal identification number associated with said unique identification code, said central computer comparing credit stored in said gaming machines with credit stored in said central computer to control play of said gaming machines.

21. The gaming machine of claim 20, wherein said means for positionally changing the number positions is a computer controlled random position generator.